(12) United States Patent
Ollgaard

(10) Patent No.: US 8,938,931 B2
(45) Date of Patent: *Jan. 27, 2015

(54) WIND TURBINE TOWER SUSPENSION MEANS

(75) Inventor: Borge Ollgaard, Esbjerg (DK)

(73) Assignee: Vestas Wind Systems A/S, Aarhus N (DK)

( * ) Notice: Subject to any disclaimer, the term of this patent is extended or adjusted under 35 U.S.C. 154(b) by 859 days.

This patent is subject to a terminal disclaimer.

(21) Appl. No.: 12/726,758

(22) Filed: Mar. 18, 2010

(65) Prior Publication Data

US 2010/0186342 A1    Jul. 29, 2010

Related U.S. Application Data

(60) Division of application No. 11/932,576, filed on Oct. 31, 2007, now abandoned, and a continuation of application No. 10/157,286, filed on May 29, 2002, now abandoned.

(30) Foreign Application Priority Data

Feb. 6, 2002 (DK) ................................. 2002 00178

(51) Int. Cl.
*E04B 1/00* (2006.01)
*F03D 11/04* (2006.01)
*E04H 12/08* (2006.01)

(52) U.S. Cl.
CPC ............ *E04H 12/085* (2013.01); *Y02E 10/726* (2013.01); *F03D 11/04* (2013.01); *F05B 2240/912* (2013.01); *Y02E 10/728* (2013.01); *F05B 2260/302* (2013.01)
USPC ................... 52/745.18; 52/633; 52/651.07

(58) Field of Classification Search
USPC ............... 52/633, 745.18, 651.01, 651.07; 248/206.5; 403/410
See application file for complete search history.

(56) References Cited

U.S. PATENT DOCUMENTS

| | | |
|---|---|---|
| 2,727,650 A | 12/1955 | Moynihan et al. |
| 2,890,848 A | 6/1959 | Johnson, Jr. |
| 2,939,671 A | 6/1960 | Beekman |
| 2,977,082 A | 3/1961 | Harris |
| 3,051,875 A | 8/1962 | Farwell |
| 3,100,275 A | 8/1963 | Gantz |

(Continued)

FOREIGN PATENT DOCUMENTS

| | | |
|---|---|---|
| DE | 69 16 240 U | 10/1969 |
| DE | 1 924 864 A1 | 11/1970 |

(Continued)

OTHER PUBLICATIONS

"Wind-Kraft & naturliche Energien" journal, Special Edition, 2000, English Abstract, 8 pgs.

(Continued)

*Primary Examiner* — Basil Katcheves
(74) *Attorney, Agent, or Firm* — Patterson & Sheridan, LLP

(57) ABSTRACT

A method of mounting elements in a wind turbine tower, whereby the elements are partly or completely attached to the wind turbine tower by means of magnetic attraction forces. Wind turbine suspension units may be attached to the wind turbine tower, preferably completely or partly to the inner wall by means of magnetic attraction forces, which present structure-weakening attachments to the tower or part of the tower.

14 Claims, 9 Drawing Sheets

(56) References Cited

U.S. PATENT DOCUMENTS

| | | | |
|---|---|---|---|
| 3,109,619 A | 11/1963 | Krug et al. | |
| 3,230,653 A | 1/1966 | Rice | |
| 3,239,179 A | 3/1966 | Margulis | |
| 3,556,248 A | 1/1971 | Brown et al. | |
| 3,924,117 A | 12/1975 | Brindley | |
| 4,026,086 A | 5/1977 | Langley | |
| 4,272,929 A | 6/1981 | Hanson | |
| 4,565,929 A | 1/1986 | Baskin et al. | |
| 4,601,754 A | 7/1986 | Ghandehari | |
| 5,192,155 A * | 3/1993 | Meyer | 403/410 |
| 5,411,231 A | 5/1995 | Buck | |
| 5,710,567 A | 1/1998 | Funke | |
| 5,746,329 A | 5/1998 | Rondeau | |
| 5,816,548 A | 10/1998 | Blossom III | |
| 6,076,873 A * | 6/2000 | Jung | 294/65.5 |
| 6,470,645 B1 * | 10/2002 | Maliszewski et al. | 52/745.18 |
| 2001/0004819 A1 | 6/2001 | Reymann | |
| 2002/0012582 A1 | 1/2002 | Kirkegaard et al. | |
| 2002/0025220 A1 | 2/2002 | Okuda | |
| 2002/0070079 A1 | 6/2002 | Rosenwinkel | |
| 2002/0151824 A1 | 10/2002 | Fischer | |
| 2002/0175251 A1 | 11/2002 | Robinson et al. | |
| 2003/0147753 A1 | 8/2003 | Ollgaard | |

FOREIGN PATENT DOCUMENTS

| | | |
|---|---|---|
| DE | 74 35 436 | 3/1975 |
| DE | 94 13 908.3 U1 | 11/1994 |
| DE | 197 02 956 A1 | 7/1998 |
| DE | 200 03 341 U1 | 6/2000 |
| DE | 200 12 599 U1 | 11/2000 |
| DE | 100 04 246 A1 | 8/2001 |
| DE | 101 44 206 A1 | 4/2003 |
| GB | 2 238 173 A | 5/1991 |
| JP | S56 155381 | 12/1981 |
| JP | 7-201201 A | 8/1995 |
| JP | 7-47525 | 11/1995 |
| JP | 9-159067 A | 6/1997 |
| JP | 10-8866 A | 1/1998 |
| JP | 11-318580 A | 11/1999 |
| JP | 11-322234 A | 11/1999 |
| JP | 2000-158250 A | 6/2000 |
| JP | 2001-69647 A | 3/2001 |
| JP | 2001-122057 A | 5/2001 |
| WO | 00 36724 A2 | 6/2000 |
| WO | 02 38953 | 5/2002 |

OTHER PUBLICATIONS

"Wind-Kraft & naturliche Energien" journal, vol. 3, Issue 01, 2001, English Abstract, 4 pgs.

Enercon-Magazine, "Windblatt", Issue 01, 2001, English Abstract, 3 pgs.

Enercon-Magazine, "Windblatt", Issue 05, 2001, English Abstract, 5 pgs.

Erich Hau, "Windkrafanlagen", Springer, Berlin, 1996, English Abstract, 4 pgs.

International Search Report, PCT/DK03/00308, Nov. 6, 2003, 8 pgs.

International Search Report, PCT/DK03/00073, May 15, 2003, 10 pgs.

Rompp-Chemie-lexikon, vol. 4, Issue 10, 1998, pp. 2861 left column, section "Verw", English Abstract, 4 pgs.

Rompp-Chemie-lexikon, vol. 5, Issue 9, pp. 3981, left column, last section, English Abstract, 5 pgs.

* cited by examiner

WIND TURBINE TOWER SUSPENSION MEANS

CROSS-REFERENCE TO RELATED APPLICATIONS

This application is a divisional of U.S. patent application Ser. No. 11/932,576 filed on Oct. 31, 2007 which is a continuation of U.S. patent application Ser. No. 10/157,286 filed on May 29, 2002 which claims priority to Danish Patent Application No. 2002 00178 filed on Feb. 6, 2002, all of which said applications are incorporated herein by reference in their entirety.

TECHNICAL FIELD

The present invention relates to a method of mounting elements in a wind turbine tower.

BACKGROUND

Typically, wind turbine towers carry the nacelle and the rotor of a wind turbine in order to allow for the desired rotation of the rotor and to raise the rotor into a position as far as possible from the ground as wind speeds typically increase with the distance to the ground.

A wind turbine tower may be constructed according to several different principles, e.g., as tubular steel towers, lattice towers, or even concrete towers.

Most large wind turbines are delivered with tubular steel towers manufactured in sections of 20-30 meters with flanges at both ends, and bolted together on the site. The towers are typically conical in order to increase strength and save materials at the same time.

The steel towers typically comprise an interior with platforms, ladders, illumination means, power cables, lifts, etc. The components are welded to the inner surface of the steel tower section, or directly attached to the fittings, which have been welded and/or bolted to the tower.

One of several problems associated with the above-described wind turbine towers is that the welding or bolting of especially the interior tower components such as ladders, cables, etc., weaken the tower structure.

In some cases, it is possible to compensate for this problem by taking relatively costly precautions, which may, in turn, infer significant structural limitations for which no compensation is made.

SUMMARY

The invention relates to a method of mounting elements in a wind turbine tower (10, 11, 12, 13, 14), whereby said elements are partly or completely attached to the wind turbine tower (10, 11, 12, 13, 14) by means of magnetic attraction forces.

According to the invention, the wind turbine suspension units may be attached to the wind turbine tower, preferably completely or partly to the inner wall by means of magnetic attraction forces, thereby preventing structure-weakening attachments to the tower or part of the tower.

According to the invention, a wind turbine tower may comprise of a number of tower sections.

When said magnetic attraction forces are established by means of permanent magnetic materials interacting with other magnetic materials, a further advantageous embodiment of the invention has been obtained.

Permanent magnetic materials may be relatively stable and the necessary attraction forces may be maintained over a relatively long period.

When said magnetic attraction forces are established by means of permanent magnetic materials comprised in a suspension unit (20; 60) interacting with magnetic materials forming at least a portion of a wind turbine tower, a further advantageous embodiment of the invention has been obtained.

If the wind turbine tower comprises a magnetic material, steel or the like, a suspension unit according to the invention may advantageously be provided with permanent magnets.

When said magnetic attraction forces are supplemented by mechanical fixation in at least one direction, a further advantageous embodiment of the invention has been obtained.

According to the invention, a typical application of a suspension unit may be regarded as a "hybrid suspension" in the sense that the magnetic forces are primarily applied in order to handle the transverse suspension forces, whereas mechanical suspension forces primarily deal with vertical suspension, i.e., typically gravity induced force on the suspended structure.

Evidently, some suspension units may be applied for suspension based on magnetic attraction forces only if the magnetic attraction forces available are sufficient for the desired attachment.

When said mechanical fixation in at least one direction is established by mechanical fixation to fixation areas (31, 32), said fixation areas being arranged in substantially the vertical direction of a wind turbine tower, a further advantageous embodiment of the invention has been obtained.

According to the invention, wind turbine tower components may be mechanically suspended between the end point(s) of the turbine tower or wind turbine tower sections, thereby avoiding weakening of the wind turbine tower, which is typically caused by welding.

The magnetic attachment means may then form a supplement to the mechanical suspension in areas in which no mechanical attachment is desired or possible.

When said mechanical fixation in at least one direction is established by mechanical fixation to fixation areas, said fixation areas being arranged at a certain distance from each other in the vertical direction of a wind turbine tower, said distances constituting approximately the vertical length of a wind turbine tower section (11, 12, 13, 14), a further advantageous embodiment of the invention has been obtained.

When said fixation areas comprise flanges (131, 142) adapted to joining the wind turbine tower sections (11, 12, 13, 14), a further advantageous embodiment of the invention has been obtained.

According to the invention, the suspension method may be applied in more or less traditional wind towers or tower sections.

Moreover, the invention relates to a wind turbine tower suspension unit (20; 60), said wind turbine tower suspension unit (20; 60) comprising magnetic attachment means (24).

According to the invention, the wind turbine suspension unit may be attached to the wind turbine tower, preferably completely or partly to the inner wall by means of magnetic attraction forces.

A unit according to the invention may advantageously be applied for by attaching the interior of a wind turbine tower, such as a ladder, ladder parts, illumination means, lifts, platforms, power cables, etc.

According to the invention, improved suspension has been obtained since the desired attachment may be obtained by means of non-destructive attachment. In particular, the material properties of the tower or tower modules may remain substantially unaffected when attaching components or fittings to the surface of the tower.

Moreover, the amount of steel used for e.g. a tubular steel tower may be reduced significantly when avoiding or minimizing structure weakening joining process(es).

When said magnetic attachment means (24) are comprised by a permanent magnetic material, a further advantageous embodiment of the invention has been obtained.

According to a preferred embodiment, the permanent magnetic material comprises at least one anisotropic magnet.

When said permanent magnetic material comprises permanent Neodym magnets, a further advantageous embodiment of the invention has been obtained.

According to a preferred embodiment of the invention, Neodym magnets are applied due to the fact that they feature strong magnetic attraction compared to other available magnetic materials.

When said permanent magnetic material comprises permanent Samarium-Cobalt magnets, a further advantageous embodiment of the invention has been obtained.

When said wind turbine tower suspension unit (20; 60) comprises mechanical fixating means (22; 62), a further advantageous embodiment of the invention has been obtained.

According to the invention, the magnets applied should preferably feature a relatively high magnetic energy level and be resistant to demagnetizing, i.e. maintain the magnetic properties in different environments, both during mounting and during normal variations in e.g. temperature, humidity, etc.

Interior elements may then be attached to the mechanical fixation means by means of traditional attachment precautions.

When said wind turbine tower suspension unit (20) comprises at least one barrier (23) encapsulating said magnetic attachment means (24), a further advantageous embodiment of the invention has been obtained.

When said barrier (23) prevents transportation of humidity to the magnetic means (24), a further advantageous embodiment of the invention has been obtained.

According to the invention, degradation of especially the permanent magnetic material may be avoided simply by avoiding transportation of humidity into the magnet material.

When said barrier layer comprises rubber, a further advantageous embodiment of the invention has been obtained.

When said unit comprises means for receiving mechanical attraction forces in at least one first direction and means for establishment of magnetic attraction forces in at least one second direction, said at least one other direction being substantially transverse in relation to said at least one first direction, a further advantageous embodiment of the invention has been obtained.

When said unit comprises ladder fixating means, a further advantageous embodiment of the invention has been obtained.

When said unit comprises platform fixating means, a further advantageous embodiment of the invention has been obtained.

When said unit comprises cable fixating means, a further advantageous embodiment of the invention has been obtained.

When said unit comprises illumination means, a further advantageous embodiment of the invention has been obtained.

When said unit comprises mechanical fixtures for receipt of standard mechanical fastening means, a further advantageous embodiment of the invention has been obtained.

Moreover, the invention relates to a method of mounting suspension units whereby said units are attached to at least one wind turbine tower portion by means of computer-controlled positioning systems.

Moreover, the invention relates to a method of mounting suspension units whereby an electromagnetically generated magnetic field is applied for complete or partly temporary demagnetization of the suspension when the suspension unit is positioned at the attachment location.

Moreover, the invention relates to a method of de-attaching suspension units whereby an electromagnetically generated magnetic field is applied for complete or partly temporary demagnetization of the suspension unit, thereby facilitating de-attachment of the suspension unit by means of reduced de-attachment forces.

Moreover, the invention relates to a method of re-arranging suspension units whereby an electromagnetically generated magnetic field is applied for complete or partly temporary demagnetization of the suspension unit, thereby facilitating rearrangement of the suspension unit.

Moreover, the invention relates to a system of mutually attachable members, said system comprising at least one magnetic wind turbine tower portion, said system comprising at least one suspension unit (20; 60), said at least one suspension unit (20; 60) comprising at least one permanent magnetic portion (24), said at least one permanent magnetic portion (24) facilitating magnetic attachment of at least one suspension unit (20; 60) to said at least one magnetic wind turbine tower portion.

When said at least one magnetic wind turbine tower portion comprises a wind turbine tower (11, 12, 13, 14; 10), a further advantageous embodiment of the invention has been obtained.

When said wind turbine tower portion comprises a magnetic material of magnetic steel, a further advantageous embodiment of the invention has been obtained.

When said magnetic steel comprises steel S235 JR, JO, J2G3 or S 355 JO or J2G3, a further advantageous embodiment of the invention has been obtained.

Suspension unit comprising permanent magnet(s) according to the invention is suitable for fastening to the above-mentioned materials.

When said at least one permanent magnetic portion (24) comprises a Neodym magnetic material or Samarium-Colbalt magnetic material, a further advantageous embodiment of the invention has been obtained.

When said system comprises at least one suspension unit (20; 60), a further advantageous embodiment of the invention has been obtained.

When said tower comprises at least two tower sections (11, 12, 13, 14), a further advantageous embodiment of the invention has been obtained.

When at least one of said tower sections is conical, a further advantageous embodiment of the invention has been obtained.

When at least one of said tower sections comprises mechanical attachment areas (131, 142) arranged in the upper and lower parts of said at least one tower section, a further advantageous embodiment of the invention has been obtained.

When at least one of said mechanical attachment areas (131, 142) facilitates mechanical attachment of at least one suspension unit (20; 60) and suspension to said at least one of said mechanical attachment areas (131, 142), a further advantageous embodiment of the invention has been obtained.

When at least two of said mechanical attachment areas (131, 142) facilitate mechanical attachment of at least one suspension unit (20; 60) and suspension between said at least two of said mechanical attachment areas (131, 142), a further advantageous embodiment of the invention has been obtained.

BRIEF DESCRIPTION OF THE DRAWINGS

The invention will now be described in detail with reference to the drawings, in which.

DETAILED DESCRIPTION

Most large wind turbines are delivered with tubular steel towers manufactured in sections of 20-30 meters with flanges at both ends, and bolted together on the site. The towers are conical (i.e. the diameter increases towards the base) in order to increase strength and save materials at the same time.

The production costs of the wind turbine towers are relatively high compared with the manufacturing costs of the complete wind turbine construction. Moreover, these costs increase proportionally with the height and especially if it exceeds around fifty meters.

It is therefore quite important with respect to the final cost of energy to build towers as optimally as possible.

Figure 1C:
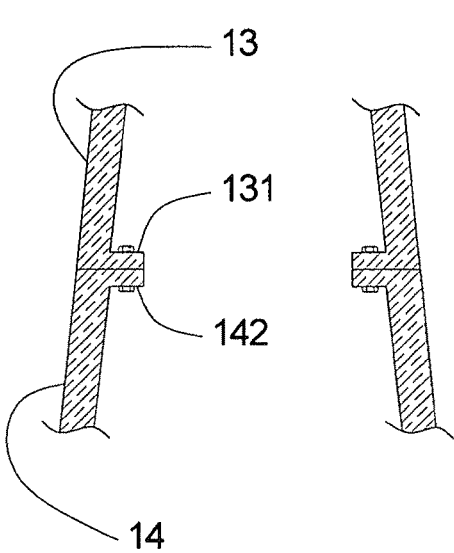
FIG. 1C illustrates a joining between two tower sections.
Figure 1A:
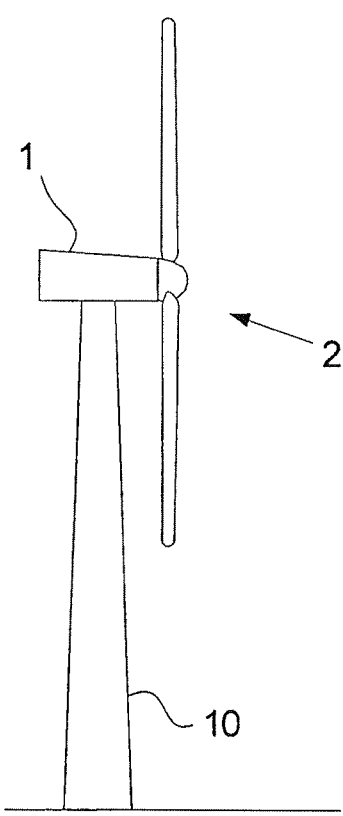
FIG. 1A illustrates a wind turbine.

FIG. 1A illustrates a typical wind turbine. The wind turbine comprises a tower 10 founded to the ground by means of a foundation. The tower 10 carries a nacelle 1 and a rotor 2.

Today, most modern wind turbine towers are conical tubular steel towers.

Figure 1B:
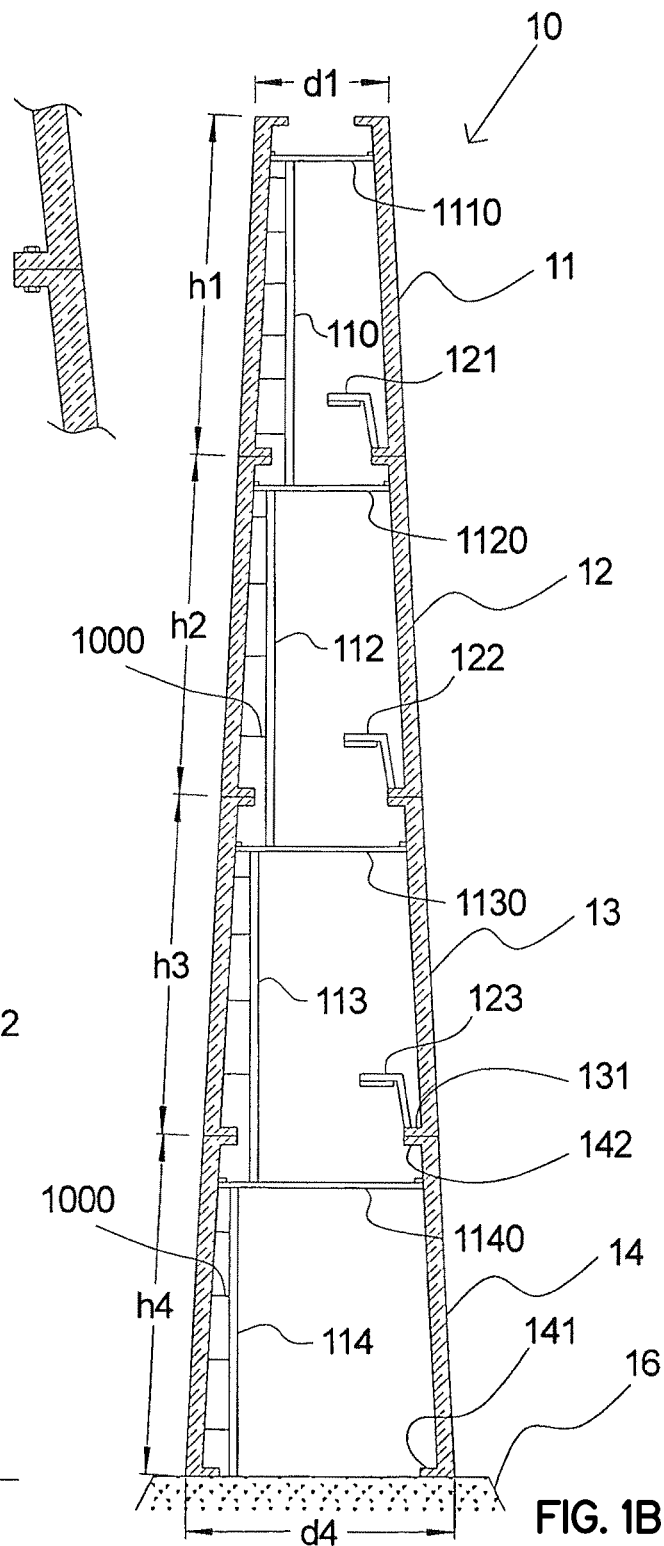
FIG. 1B illustrates a wind turbine tower according to an embodiment of the invention.

FIG. 1B shows the cross section of such an exemplary tubular steel tower.

The illustrated wind turbine tower 10 comprises a number of conical tower sections 11, 12, 13, and 14. The length of the sections 11, 12, 13 and 14 are h1, h2, h3, h4, respectively.

The complete tower is conical and each of the sections 11, 12, 13, and 14 is conical and the upper diameter is d1 and the lower diameter is d4.

Hence, the towers may be assembled from these smaller, conical subsections 11, 12, 13, and 14 cut and molded into the right shape, and subsequently welded together.

The tower sections 11, 12, 13, 14 are usually manufactured in h1, h2, h3, h4=20 to 30 meter sections, the limiting factor being transportation on e.g. roads or by rail.

The illustrated tower sections 11, 12, 13, 14 have flanges 131, 142 at both ends, and may be bolted together on the site.

The towers are conical (i.e. the diameter increases towards the base) in order to increase strength and save materials at the same time.

Typically, modern tower weights are 40 metric tonnes for a 50 m tower for a turbine with a 44 m rotor diameter (e.g. a 600 kW wind turbine), and 80 metric tonnes for a 60 meters tower for a 72 m rotor diameter (e.g. a 2000 kW wind turbine).

The illustrated tower may e.g. be an 80 (eighty) metric tonnes tower. The lower and upper diameters d4 and d1 may e.g. be approximately 4.2 meters and 2.3 meters, respectively.

It should be emphasized that the illustrated wind turbine tower and the illustrated choice of dimensions should in no way be regarded as restriction of the invention to the illustrated tower.

FIG. 1C illustrates a detailed view of a joining of two sections 13, 14.

A lower flange 131 of the tower section 13 is bolted together with an upper flange 142 of the tower section 14. Evidently, the other sections may be joined in the same way.

The interior components of the above-described tower of FIG. 1B may typically be comprised by platforms 1110, 1120, 1130, 1140, ladders 111, 112, 113 and 114, illumination means 121, 122, 123, power cables (not shown), lifts (not shown), etc (not shown).

The interior components are attached to the tower e.g. by means of suitable fittings attached to the inner surface of the tower.

The platforms 1110, 1120, 1130, 1140 may e.g. be suspended to attachment areas located near the assembly joints of the tower fittings, e.g. the upper and lower flanges of the tower sections 11, 12, 13, 14.

The platform may simply be attached to these joinings, e.g. flanges, by means of wires fixed to the platform at the lower end and to the flanges at the upper end. Thus, vertically, the platform is mechanically attached to the flange and hanging in the wires, whereas the platform comprises permanent magnetic suspension units providing magnetic fixation of the platform with respect to non-vertical excitation forces of the platform.

Figure 2A:
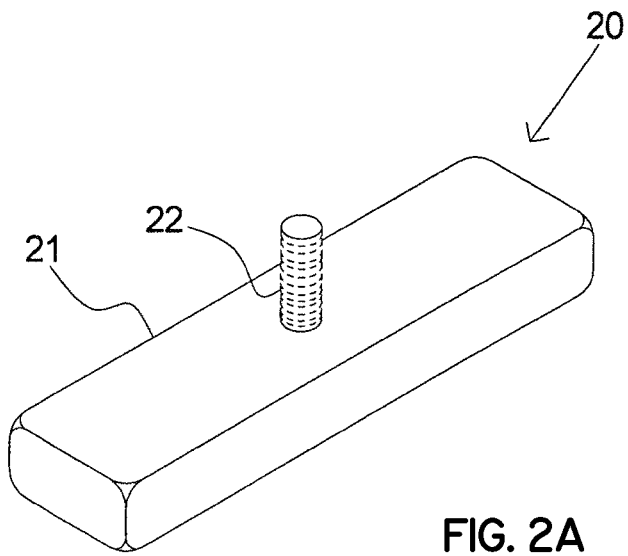
FIGS. 2A-2D illustrate a suspension unit according to a preferred embodiment of the invention.

FIG. 2A illustrates a wind turbine tower suspension unit 20 comprising a main body 21 and a mechanically connectable member or section 22 to which mechanical structures may be fixated by suitable fixation means.

The dimensions of the main body 21 of the illustrated unit may e.g. be approximately 200 mm×50 mm×25 mm and the weight may be approximately ½ kilogram.

Figure 2B:
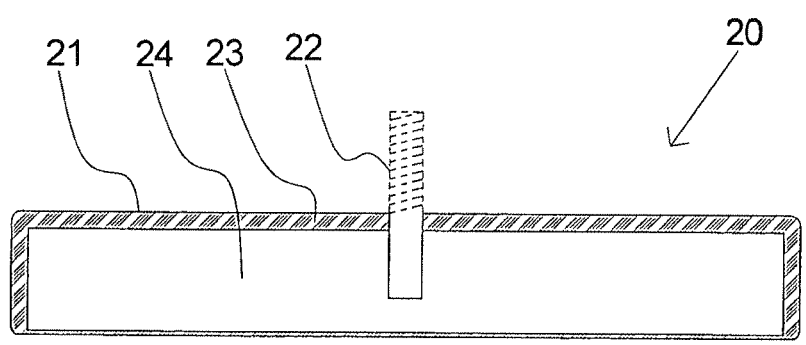

FIG. 2B shows a cross-section of the above-described wind turbine tower suspension unit 20.

The unit comprises a magnet 24 comprising one or a group of magnets. The magnet is a permanent magnet.

The characteristics of the magnet are described in detail below.

The magnet 24 is encapsulated by a barrier material 23 of e.g. rubber.

Advantageously, the barrier material should feature a relatively high friction coefficient, thereby maximizing the transversal conservative forces between the unit and the tower inner surface when the unit is attached to an inner surface by magnetic force in the usual direction.

The barrier material protects the magnet from humidity and dust, thereby preventing corrosion or other physical degradation of the magnet.

Moreover, a mechanically connectable member or section 22 is fastened to the main body of the unit. In this case, the magnet and the member or section 22 extend to the exterior of the unit and form a bolt, e.g. M10×30, at the end.

The bolt 22 may be fitted to a suitable nut, thereby providing fixation of a suitable fitting to the unit.

Please note that the lower part of the rubber sealing is quite thin in order to obtain the strongest possible attraction forces.

Figure 2C:
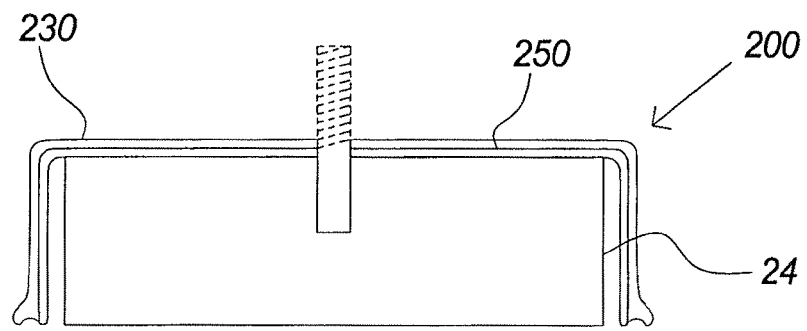

FIG. 2C shows a further embodiment of the invention.

The illustrated suspension unit 200 comprises a U-shaped steel cover 250 arranged to be in galvanic contact with a permanent magnet 24, such as Neodym. The assembly has been formed with an upper sealing 230. The sealing is provided with a lip 231 adapted to engage with an underlying surface, thereby providing air-tight and water-proof enclosure around the magnet 24 once it is mounted.

The U-shape of the magnet provides an improved magnetic coupling to the underlying surface.

Evidently, other standard types of magnet configurations may be applied within the scope of the invention.

Figure 2D:
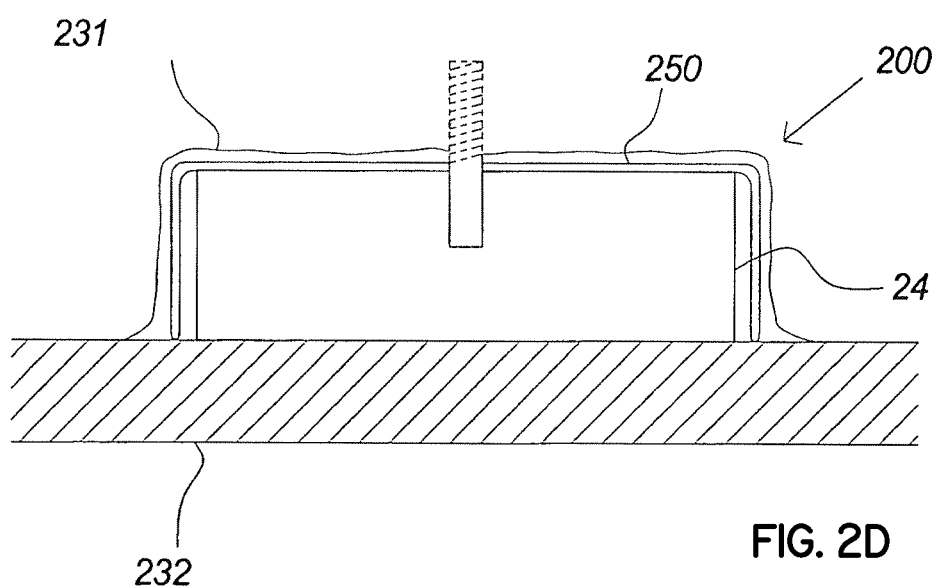

FIG. 2D illustrates a further embodiment of the invention in which a suspension unit 200 comprises a magnet 24 arranged with a U-shaped magnetic conducting cover 250.

When the unit 200 has been magnetically attached to a surface 232, the entire assembly is subsequently covered by a suitable sealing means 231, e.g. tectyle, etc.

Figure 3:
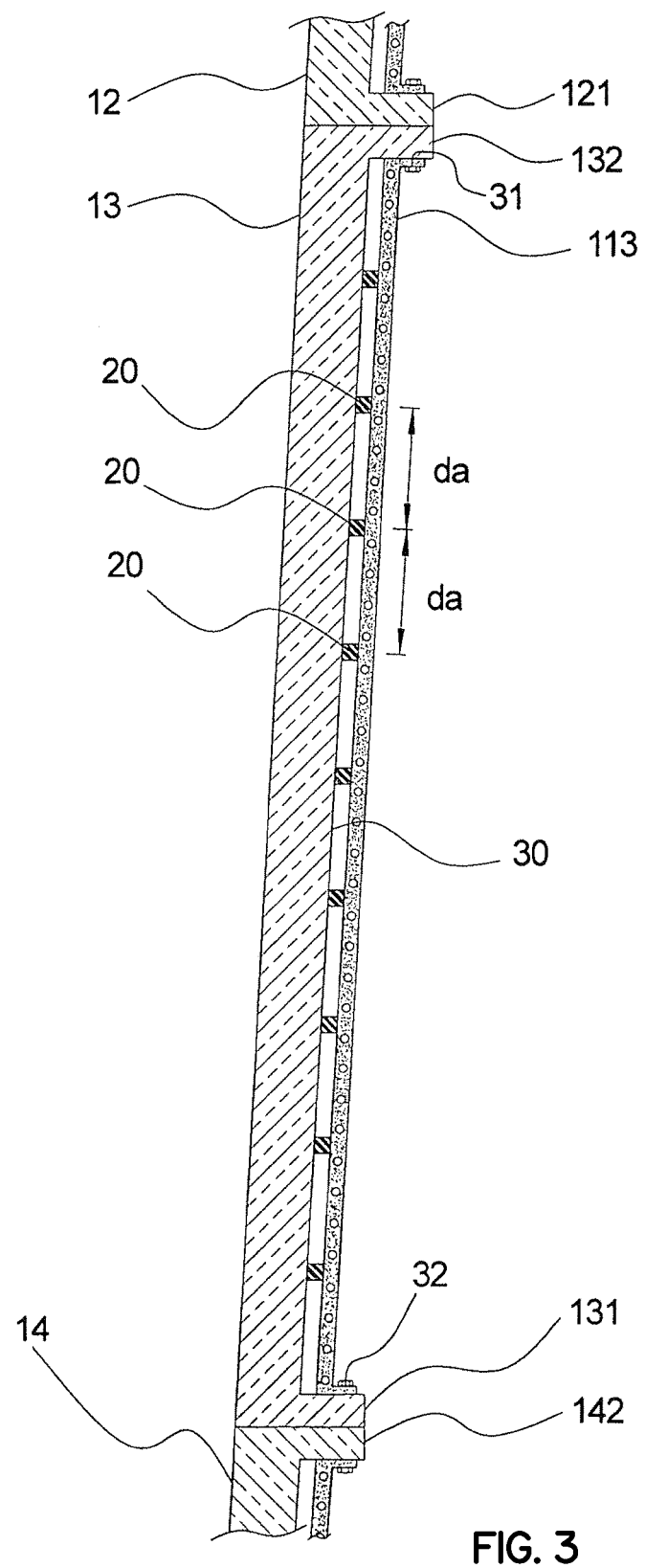
FIG. 3 illustrates fixation of a ladder within a wind turbine tower according to an embodiment of the invention.

FIG. 3 illustrates an advantageous embodiment of the invention.

The figure illustrates a cross-section of the tower section 13 illustrated in FIG. 1B. According to the illustrated embodiment, a ladder 113 is fixated to the inner surface 30 of the wind turbine tower section 13.

The ladder is suspended mechanically in two suspensions to the tower section, an upper mechanical suspension 31 and a lower mechanical suspension 32.

Bolting, welding, etc. may e.g. obtain the suspension of the ladder to the tower.

Moreover the ladder is suspended in the tower by means of a number of wind turbine suspension units 20, e.g. illustrated in FIGS. 2A and 2B, or derivatives thereof.

The units 20 are attached to the inner surface by means of magnetic forces established by the magnets of the units 20, and the ladder may be attached to the units 20 e.g. by means of the fittings 22 of the units 20.

Basically, it may be appreciated that the main fixation in the vertical direction is obtained by means of mechanical end-point fixation to the tower, the upper flange 132 and lower flange 131 of the tower section 31, while the transverse fixation (i.e. the non-vertical) is obtained magnetically by means of the units 20.

According to the illustrated embodiment the vertical mechanical stress is primarily created by traditional mechanical attachment to the tower, e.g. by welding and/or bolting, while fixation of the ladder 31 is primarily obtained by magnetic fixation to the inner surface 30 of the tower section 13.

The distance between the suspension unit 20 in the vertical direction may e.g. be between 0.5 meter and 4 meters depending on the requirements to the fixation.

A preferred vertical distance is between 1.5 to 2.3 meters.

Evidently, a suspension unit according to the invention may be applied for fixation of several other interior components than the illustrated ladder.

According to a further embodiment of the invention, a ladder construction may e.g. be fixated to the tower by the above-described provisions and the further interior components such as lamps, power cables, etc. may then be fixated to the ladder construction itself by traditional attachment mechanics, welding, bolting, etc.

Figure 4:
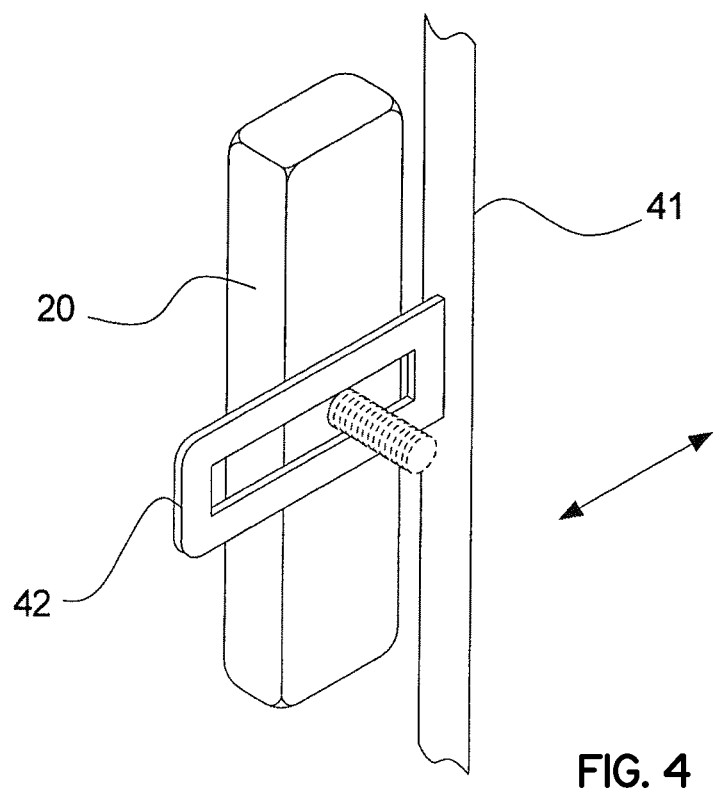
FIG. 4 illustrates assembly of a suspension unit according to one embodiment of the invention and a fitting.

FIG. 4 illustrates a further embodiment of the invention in which a tube 41 (e.g. of a ladder, a platform fitting, etc.) comprises a fitting 42 which is attached to a suspension unit 20 by means of a nut (not shown) fitted to the bolt 22 of the suspension unit.

The unit 20 may be magnetically attracted to an underlying surface, e.g. the above-described inner surface of a steel tower section wall, thereby establishing attachment by normal forces between the underlying surface and the tube 41.

Moreover, it should be noted that the fitting facilitates a degree of tolerance in the direction of the illustrated arrow between the fitting 42 and the bolt 22 of the suspension unit 20.

The freedom of tolerance provides a certain degree of tolerance when attaching the suspension units 20 to a tower in the manner suggested by the invention.

Figure 5A:
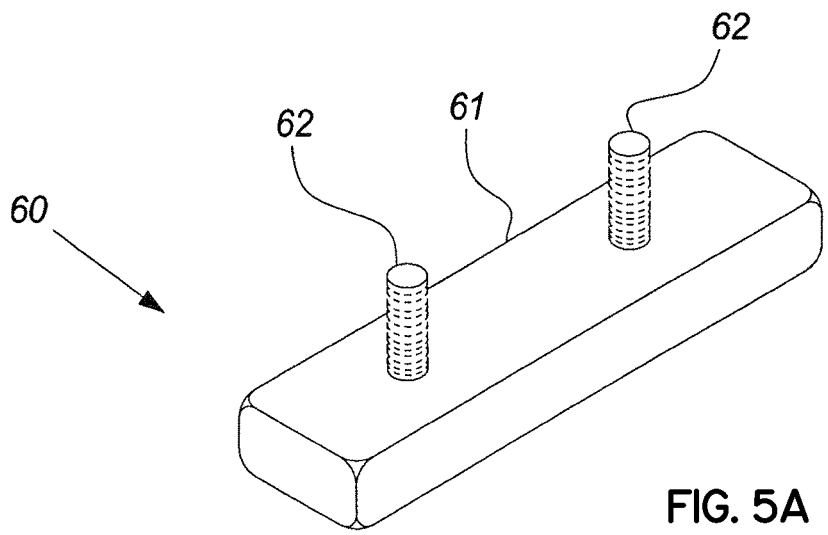
FIGS. 5A and 5B illustrate a further suspension unit according to the invention.

FIG. 5A illustrates a further embodiment of the invention.

The illustrated suspension unit 60 comprises a main body 61 and two bolts 62.

Basically, the illustrated suspension unit 60 is constructed according to the principles outlined in the single-bolt version of the unit in FIG. 2B.

Figure 5B:
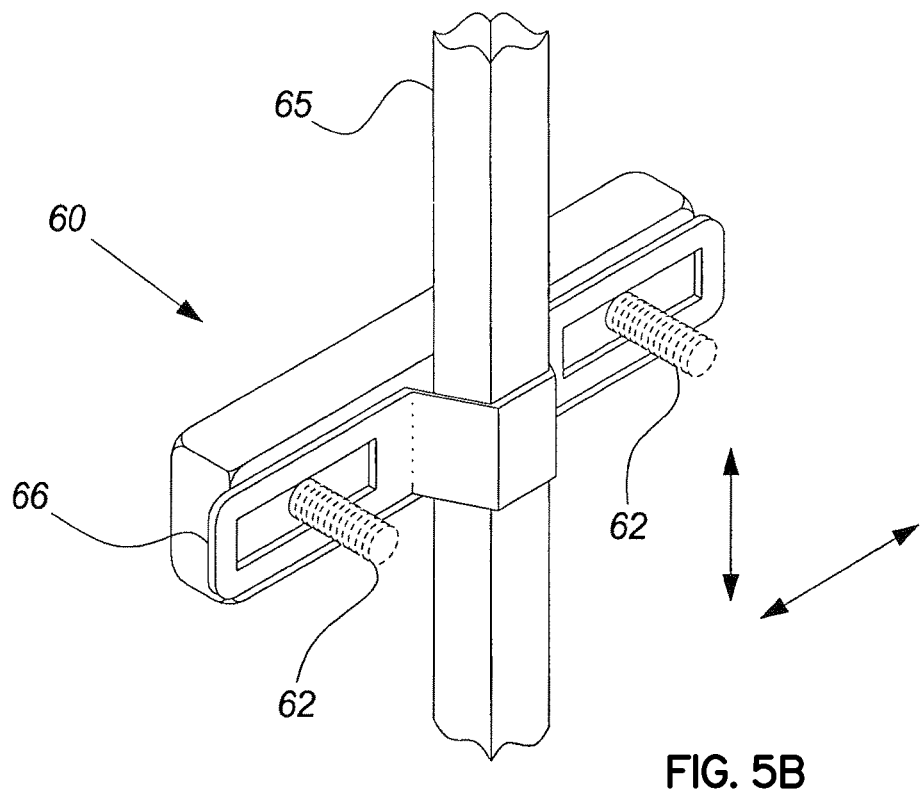

FIG. 5B illustrates the fitting of e.g. a steel bar 65 to the suspension unit 60.

The steel bar 65 is mechanically fixated to the suspension unit 60 by means of a suitable fitting 66 by means of nuts (not shown).

It should be noted that the illustrated assembly features a certain degree of tolerance in both the "vertical" and "horizontal" directions as illustrated by the arrows.

Figure 6A:
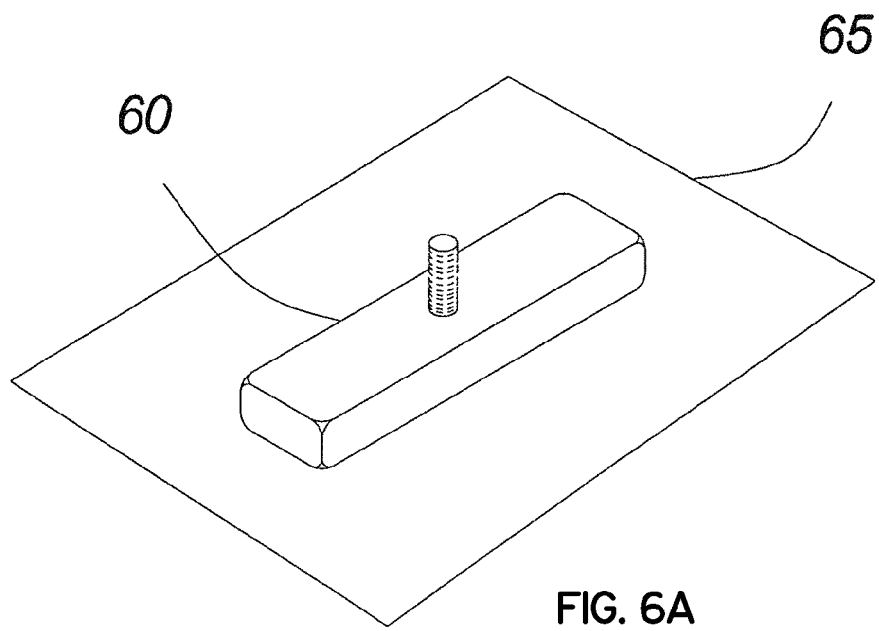
FIG. 6 illustrates the main force directions of an applicable attachment according to one embodiment of the invention.
Figure 6B:
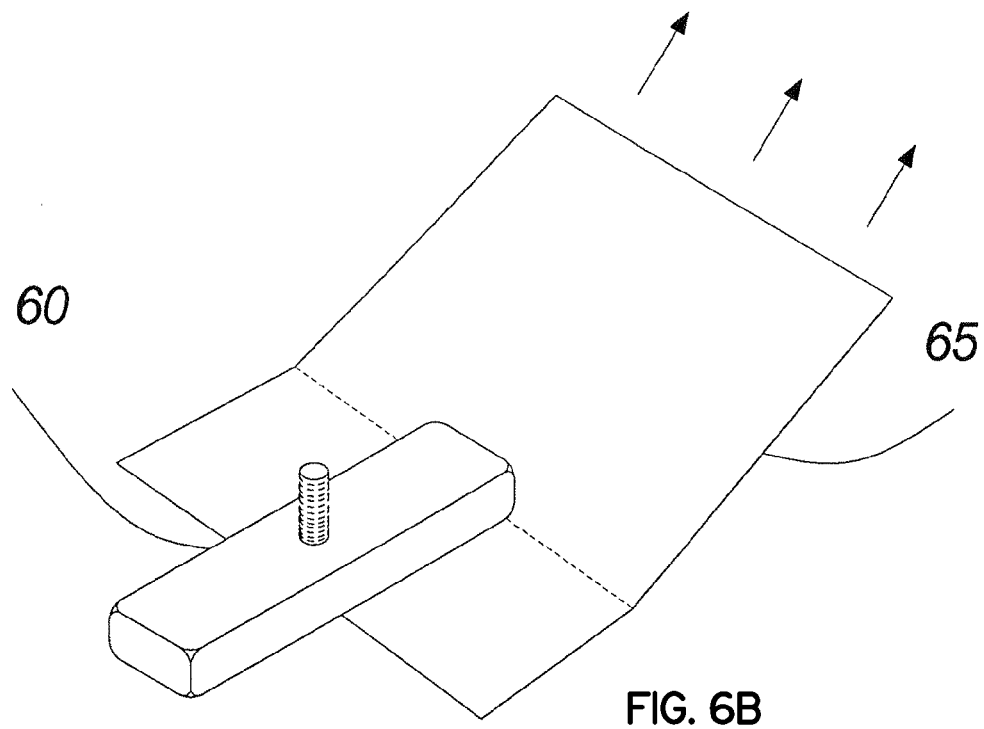

FIGS. 6A and 6B illustrate a method of mounting a suspension unit 60 according to the invention to a magnetic surface (not shown), e.g. a steel wind turbine tower.

Initially, in FIG. 6A a suspension unit is arranged on e.g. a steel surface. A nylon sheet 65 is located between the underlying surface and the suspension unit 60. Due to the thickness of the sheet and the relatively low friction, the suspension unit 60 and the sheet 65 may be displaced relatively easily to the exact desired position.

In FIG. 6B, the desired position has been reached, and the sheet 65 is removed, whereby stronger attachment forces have been obtained.

Figure 7A:
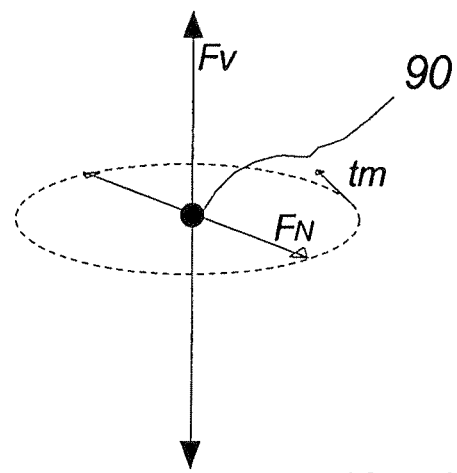
FIG. 7 illustrates the properties of permanent magnetic materials.
Figure 7B:
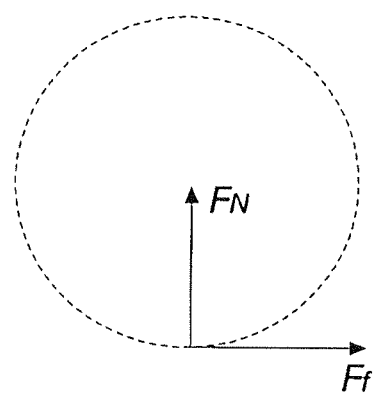

FIGS. 7A and 7B illustrate the main force directions $F_V$ and $F_N$ acting on a suspendable element 90 in an attachment according to one embodiment of the invention.

Vertical mechanical fixation ensures that the interior structure to be suspended is fixed in relation to the tower, at least with respect to gravity. These forces are primarily dealt with as vertical forces $F_V$. Basically, the vertical forces should primarily be handled by traditional mechanical attachment so to speak.

Moreover, the magnetic suspension provides transverse fixation of the suspended element established by means of normal force $F_N$ acting in the illustrated transverse direction. This normal force $F_N$ may be exploited further, if friction members are applied between the suspension unit and the corresponding magnetic tower portion. Hence, according to well-known relationships between normal force $F_N$ and the frictions, transverse force is established to counteract e.g. rotational movements (tangential movement tm) of e.g. a platform or a ladder suspension.

Figure 8:
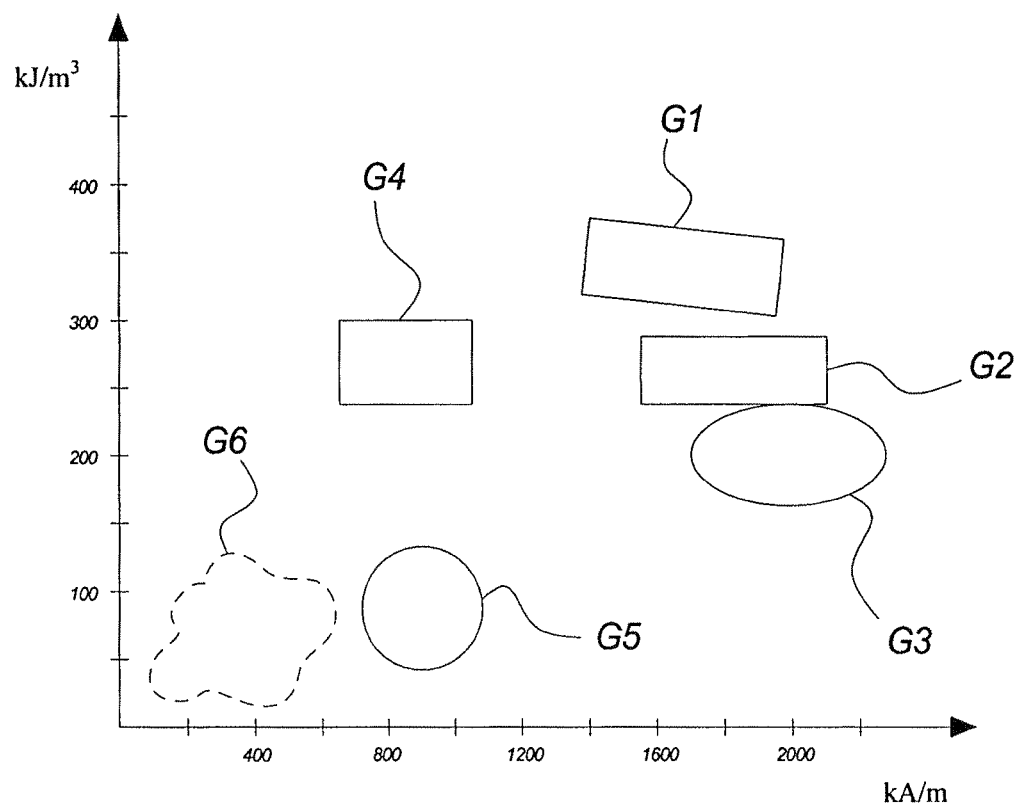
FIG. 8 illustrates the properties of different permanent magnetic materials.

FIG. 8 illustrates some of the properties of different permanent magnetic materials.

The illustrated diagram illustrates the behavior of six groups of magnetic materials, G1 to G6 at a temperature of approximately 20 degrees Celsius.

The x-axis represents HcJ (Coercivity [kA/m] and the y-axis represents maximum energy product $|BH|_{max}[kJ/m^3]$.

|BH|$_{max}$ represents the energy potential of the material, whereas HcJ represents the material's ability to resist demagnetizing fields.

Group G1 comprises so-called Neodym magnets, NdFeB. The Neodym magnets are some of the most powerful permanent magnets on the market.

Groups G2 and G3 comprise Sm$_x$Co$_y$ magnets characterized by a high degree of stability with respect to variation in temperature. Group G2 refers to Sm$_2$Co$_{17}$ and Group G3 refers to SmCo$_5$.

Group G4 refers to a further group of so-called low H$_c$ Sm$_x$Co$_y$ magnets, Sm$_2$Co$_{17}$.

Group G5 comprises a group of plastic-bounded Neodym magnet material NdFeB.

Finally, group G6 comprises more traditional magnet materials such as Alnico and FeSr/FeBa materials.

Different magnetic materials may be applied in a suspension unit according to the invention.

According to a preferred embodiment of the invention, the applied permanent magnetic materials are primarily selected from materials featuring a high energy potential |BH|$_{max}$. Hence, according to a preferred embodiment of the invention, the materials are chosen from group G1, i.e. the Neodym magnets.

Evidently, if for instance temperature variations become critical, Samarium-Cobalt magnets may be preferred.

According to the invention, suspension units may e.g. be combined by units having magnets from different groups, thereby creating a degree of redundancy.

What is claimed is:

1. A method of mounting an interior component of a wind turbine tower to an inner surface of the tower, comprising:
   magnetically attaching a suspension unit to the inner surface, the suspension unit having a main body and a mechanically connectable member extending from the main body;
   positioning a fitting of the interior component onto the mechanically connectable member after magnetically attaching the suspension unit to the inner surface of the tower; and
   securing the fitting to the mechanically connectable member.

2. The method of claim 1, wherein the mechanically connectable member is a bolt and the fitting is secured to the mechanically connectable member with a nut.

3. The method of claim 1, wherein the fitting of the interior component is positioned onto the mechanically connectable member with a degree of tolerance to allow adjustment.

4. The method of claim 3, further comprising:
   adjusting the position of the fitting relative to the suspension unit in a first direction after positioning the fitting onto the mechanically connectable member;
   thereafter, adjusting the position of the fitting relative to the interior component in a second direction; and
   securing the fitting to the interior component.

5. The method of claim 1, further comprising:
   positioning a thin sheet of material between the inner surface of the tower and the suspension unit before magnetically attaching the suspension unit;
   moving the thin sheet of material and suspension unit to a desired position on the inner surface after magnetically attaching the suspension unit; and
   removing the thin sheet of material from between the suspension unit and inner surface.

6. The method of claim 1, wherein magnetically attaching the suspension unit to the inner surface further comprises:
   temporarily applying an electromagnetically-generated magnetic field to at least partially demagnetize the suspension unit; and
   positioning the suspension unit against the inner surface and moving it to a desired location.

7. The method of claim 6, further comprising:
   detaching the suspension unit from the inner surface by applying an electromagnetically-generated magnetic field to at least partially demagnetize the suspension unit.

8. The method of claim 1, further comprising:
   covering the main body of the suspension unit with sealing means after magnetically attaching the suspension unit to the inner surface of the tower.

9. The method of claim 1, wherein the main body of the suspension unit includes a magnet encapsulated by a barrier, the barrier including a first barrier portion having a first thickness and a second barrier portion having a second thickness that is less than the first thickness, and wherein magnetically attaching the suspension unit further comprises:
   arranging the suspension unit so that the second barrier portion engages the inner surface of the tower.

10. The method of claim 1, wherein the interior component is a ladder having a pair of generally parallel side rails and a plurality of steps extending between the side rails, the method further comprising:
    mechanically fixing the ladder to a first fixation area of the tower to primarily counteract vertical forces, the suspension unit magnetically attaching the ladder to the inner surface of the tower to primarily counteract horizontal forces.

11. The method of claim 10, wherein the first fixation area includes a flange, the ladder being mechanically suspended from the flange.

12. The method of claim 11, wherein the tower includes a second fixation area having a flange, the method further comprising:
    mechanically fixing the ladder to the flange of second fixation area.

13. The method of claim 1, wherein the interior component is mounted to the inner surface only by one or more of the suspension units so that structure-weakening attachments to the inner surface are avoided.

14. The method of claim 1, wherein the suspension unit is magnetically attached to the inner surface of the tower by a permanent magnet material.

* * * * *